United States Patent [19]

Wrightson

[11] 4,232,608
[45] Nov. 11, 1980

[54] DIMER ISOCYANATE LINER COMPOSITIONS

[75] Inventor: John M. Wrightson, Carmichael, Calif.

[73] Assignee: Aerojet-General Corporation, La Jolla, Calif.

[21] Appl. No.: 965,775

[22] Filed: Dec. 4, 1978

Related U.S. Application Data

[62] Division of Ser. No. 292,196, Sep. 25, 1972, abandoned.

[51] Int. Cl.² ............. F02K 9/04; C06B 45/10; F42B 1/00; B32B 27/40
[52] U.S. Cl. ............. 102/103; 86/1 R; 149/3; 156/310; 156/331; 428/420; 428/423.1; 428/423.3
[58] Field of Search ............. 428/423–425, 428/420; 156/310, 331; 102/103; 149/3, 108.8; 86/1 R; 60/39.47

[56] References Cited

U.S. PATENT DOCUMENTS

| | | | |
|---|---|---|---|
| 3,198,692 | 8/1965 | Bridgeford | 428/423 X |
| 3,255,068 | 6/1966 | Smith | 156/331 X |
| 3,255,069 | 6/1966 | Crowley et al. | 156/331 X |
| 3,433,158 | 3/1969 | Pierce | 102/103 |
| 3,442,744 | 5/1969 | Teter et al. | 102/103 X |
| 3,507,114 | 4/1970 | Webb | 528/75 X |
| 3,693,548 | 9/1972 | Dereich et al. | 86/1 R |
| 4,099,376 | 7/1978 | Japs | 60/39.47 X |

FOREIGN PATENT DOCUMENTS

| | | |
|---|---|---|
| 11481 | 2/1956 | Australia. |
| 22175 | 12/1968 | Australia. |
| 18133 | 2/1972 | Australia. |
| 783564 | 9/1957 | United Kingdom. |
| 1163264 | 9/1969 | United Kingdom. |

*Primary Examiner*—Harold Ansher
*Attorney, Agent, or Firm*—Edward O. Ansell; William M. Dooley

[57] ABSTRACT

A composition is disclosed in which a solid isocyanate compound such as toluene-diisocyanate dimer is dispersed within a polyurethane based on a hydroxy-terminated organic compound, preferably polybutadiene. The composition can be fully cured on a surface and yet provides an excess of stable material, i.e. dormant isocyanate containing groups, which are reactive on demand to strengthen interfaces with adjacent layers containing available hydroxyl groups, such as a layer of solid polyurethane-based propellant, without the need for intermediate reactive coatings.

26 Claims, 2 Drawing Figures

DIMER ISOCYANATE LINER COMPOSITIONS

This is a division of application Ser. No. 292,196, filed Sept. 25, 1972, now abandoned.

BACKGROUND OF THE INVENTION

1. Field of the Invention

The present invention relates to polyurethane compositions and more particularly to a fully cured rocket motor chamber or casing liner for use in the manufacture of a solid propellant motor.

2. Description of the Prior Art

Liner layers are required in solid propellant motors for several reasons. They are utilized to render a motor casing gas impermeable, to provide a heat insulating film between the casing and the propellant, and also as a material interposed between the chamber wall and the propellant to which the propellant can adhere. Solid propellants based on a polyurethane binder especially those made from hydroxy terminated polybutadiene (HTPB) as one of the carbamate linkage forming compounds have been found to exhibit very poor adherence to liners. This has seriously affected motor system reliability.

Even though the initial bond of the propellant to the liner may appear to be satisfactory, after aging the bond weakens so that reliability of the bonds becomes questionable. The most probable cause for change in bond characteristics on aging is the migration of plasticizers and other reactive components from the propellant to the liner during cure of the propellant. This upsets the propellant-binder cure causing the bonding polymer phase to become weaker than the propellant matrix.

HTPB propellants which usually contain as much as 35% plasticizer are generally bonded to liner-formulations which are unplasticized. When migration of plasticizer from the propellant to the liner occurs, several effects can occur. The migration of pure plasticizer from the propellant to the liner layer is not normally considered to be detrimental to adhesion as long as the plasticizer is soluble in both the propellant and substrate liner. However, the migration of impure plasticizer can cause problems.

The propellant may contain a variety of materials such as antioxidants, non-functional prepolymer, and soluble burning rate additives. These materials would ordinarily have very little tendency to migrate from the propellant. The presence of plasticizer in the propellant binder, however, results in a less tight polymer structure such that it is possible for some of said materials to migrate with the plasticizer. The migration of unreacted diisocyanate from the propellant binder into the plasticizer is the most serious cause of poor propellant-liner bond formation. This upsets the binder polymer layer stoichiometry at the interface resulting in a weak boundary layer. Occasionally this phenomenon is so severe that the interface material becomes so soft and sticky that the resulting bond strengths are very low.

Various measures have been attempted in order to improve the interfacial bonding. In one approach, a washcoat solution containing a curing agent such as toluene diisocyanate (TDI) in chlorothene was sprayed onto the surface of the cured liner stratum before application of the propellant. However, the liner did not consistently exhibit good bonding to the propellant again causing poor reliability. Poor processability and short storage life were also experienced. Formulation of the liner and/or propellant with excess curing agent, such as TDI, was attempted but was found to be unsatisfactory due to an adverse affect on the physical properties of the liner or propellant. Partially cured liners were also considered but were not found to be satisfactory due to limited time available to cast the propellant onto the partially cured liner and again adhesion of the propellant to the liner and the liner to the chamber was not always to the desired degree due to the criticality of the time required, often only a few hours, before which casting of the propellant was to take place.

OBJECTS AND SUMMARY OF THE INVENTION

It is therefore an object of the invention to provide a substrate, primer layer for a polyurethane propellant, that is fully cured at the time of casting of the polyurethane propellant layer and which does not require the use of a washcoat which contains reactive moieties.

A further object of the invention is to provide a composition having a useful bonding life of at least 30 days at +80° F. and at 30% relative humidity and that is suitable for application using existing spray equipment.

A still further object of the invention is to provide high heat insulation compositions for lining a rocket motor casing which can be directly bonded to propellant to provide superior bonds without the need of a washcoat.

Yet another object of the invention is to provide reliable liner-propellant bonding with the use of a fully cured liner.

Another object of this invention is to provide a heat-insulating liner which provides a reliable adhesive bond having an adhesive strength at least equal to the cohesive strength of the propellant.

These and other objects and attendant advantages of the invention will become apparent as the description proceeds.

Superior bonds are provided in accordance with this invention by formulating the chamber liner composition with a thermally stable, solid isocyanate precursor material which does not migrate. After complete cure of the liner composition, said material is capable of reacting on demand with compounds containing active hydrogen such as compounds substituted with hydroxyl groups contained within a layer of polyurethane propellant composition subsequently applied thereon in order to strengthen the liner-propellant interfacial polymer bond without using washcoating techniques.

The liner composition is fully cured and, therefore, its physical properties may be optimized before casting of the propellant such that the time interval before casting the propellant can be completely variable. The interfacial bond is completely reliable and the method of the invention simplifies rocket motor production techniques with a liner system that provides superior bond strengths.

The invention will now become better understood by reference to the following detailed description when considered in conjunction with the accompanying drawings.

DESCRIPTION OF THE PREFERRED EMBODIMENTS

Figure 1:
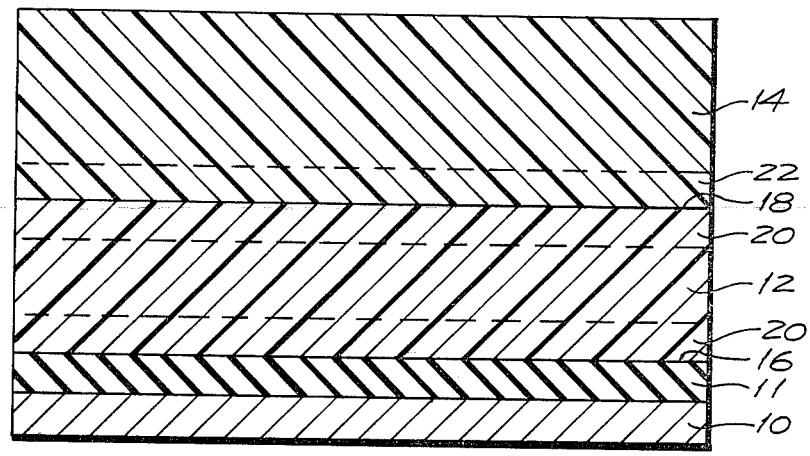
FIG. 1 is a cross-sectional view of a conventional solid propellant rocket motor.

Referring now to FIG. 1, the figure depicts the various strata that exist in the formation of a solid propellant-containing motor chamber. The motor casing or chamber 10 is typically formed of a reinforced structure, such as a woven glass or metal assembly. A heat insulation layer 11 such as an elastomer filled with asbestos or carbon may be applied to the casing 10. A liner 12 typically having a thickness of 1/64 to ¼ inch is next interposed to provide a bonding substrate to adhere the propellant 14 to the wall of the chamber 10. If liner 12 contains heat insulating fillers, the heat insulation layer 11 may not be necessary. The liner 12 forms a liner-chamber interface 16 with the chamber 10 or a liner-insulator interface 16 if a heat insulating liner is present, and a propellant-liner interface 18 with the propellant. The surface of the cured liner is polymer rich and forms a polymer rich layer 20 at each of the interfaces 16, 18.

This is also true of the propellant which forms a binder rich layer 22 at the interface 18. The binder rich layer 22 and the polymer rich layer 20 are lower in strength than the solids reinforced binder and propellant. During cure of the propellant, the reactive curing species of the binder can migrate into the liner. This considerably weakens the strength of the propellant binder rich bonding layer 22. This phenomenon causes a weak binder layer to form which results in inferior liner-propellant bonds.

The polymerization reaction for hydroxyl-terminated polybutadiene (HTPB) propellants is generally represented as:

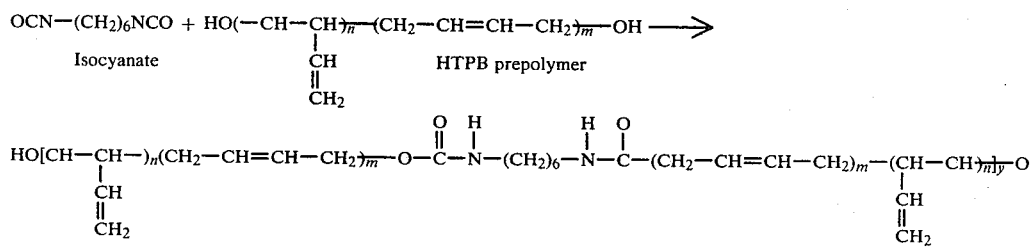

where n, m and y are integers greater than 1.

The HTPB can be of the free radical-initiated type (FR-HTPB) or of the lithium-initiated type (Li-HTPB). With FR-HTPB cross linking is achieved through the control of the isocyanate level because the prepolymer has a functionality greater than 2. The Li-HTPB has a functionality less than 2 and, therefore, requires a trifunctional cross-linking species which is usually a trifunctional hydroxy containing compound, such as the propylene oxide adduct of hexane triol. Utilizing the above reactions, about 5000 units of HTPB react with 84 units of isocyanate. The migration of isocyanate from the propellant binder interface into the liner has a substantial effect on the cure stoichiometry with a consequent reduction in the strength of the bonding polymer layer.

As discussed above, the prior techniques utilized to counteract the isocyanate migration problem were (1) the addition of supplemental isocyanate at the interface by means of washcoats containing isocyanate placed on the surface of cured liners or (2) the use of partially cured liners. In the present invention, excess isocyanate species is provided at the interface by utilizing thermally stable isocyanate precursors in excess of the amount of isocyanate normally used for stoichiometric cure of the liner. The precursor is uniformly distributed throughout the liner, is thermally stable and contains dormant isocyanate containing groups capable of reacting on demand with hydroxyl containing species such as HTPB within the adjacent propellant layer to form urethane groups which provide a strong, reliable interfacial bond.

Figure 2:
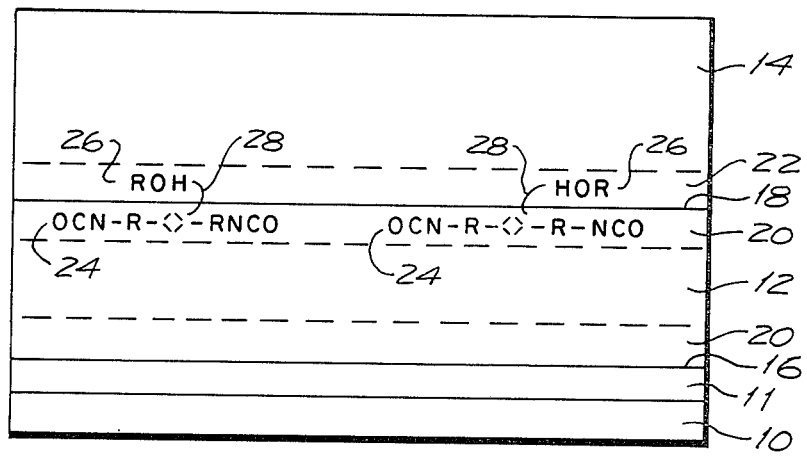
FIG. 2 is a cross-sectional view of a rocket motor in accordance with the invention.

Referring now to FIG. 2, the liner polymer rich layer 20 in accordance with the invention contains very stable isocyanate precursor species 24 reactive with the ROH compounds 26 in the binder rich layer 22 of the propellant layer 18. After application of the propellant layer 18 to the liner layer 16, the species 24 are converted or rearranged into functionally reactive compounds which react with the hydroxyl substituted species 26 to form cross-linking bonds 28 which firmly adhere the liner layer 16 to the propellant layer 18.

The liner composition of the invention generally comprises any polyurethane composition capable of wetting the surface of an adjacent layer, such as a propellant layer which contains a high loading of solids and contains available hydroxyl groups reactive with the isocyanate precursor in the liner. The liner composition is generally comprised of about 30% to 65% by weight of inert, solid fillers and from 1–10% of various additives such as cure promoters, stabilizers and thixotropic control agents and the remainder being polyurethane forming components.

Preferred liner compositions contain little or no volatile solvent or plasticizer. The composition essentially contains in part by weight 20–65 parts of a liquid hydroxyl terminated prepolymer, 15–35 parts of inert solid fillers, 4–10 parts of stabilizers and rheological control additives, 3–20 parts of reactive polymeric modifiers such as one or more diols or polyols, an equivalent amount of polyisocyanate sufficient to react with the prepolymer and hydrogen-substituted modifiers and an excess amount above stoichiometry of from 1.5 to 5 parts of a stable isocyanate precursor.

The equivalent weight of the liquid prepolymer is at least 1,000 and not usually more than 5,000. The functionality of the prepolymer is advantageously from about 1.7 to about 3.0, preferably from about 1.9 to 2.3, to form by cross-linking and chain extending final elastomeric polymers of molecular weight of at least 20,000. Since higher molecular weight prepolymers may require heat to reduce viscosity, the molecular weight is preferably from 1,000 to 3,000.

The liquid hydroxyl terminated prepolymers for the liner composition are preferably of the type that form elastomeric polymers, suitably hydroxyl terminate polymeric dienes or polyether glycols such as polyethylene glycol, polypropylene glycol and higher alkylene oxide adducts of aliphatic glycols and triols.

The liquid prepolymers are preferably of the diene elastomer type, for example, homopolymers or copolymers of a conjugated diene containing from 4–12 carbon atoms, such as 1,3-butadiene, isoprene, 2,3-dimethyl-1,3-butadiene, 1,3-pentadiene (piperlylene), 3-methyl-1,3-pentadiene and the like. In the case of a diene copolymer, the comonomer should not exceed 35% of the polymer in order to preserve elastomeric properties. Suitable comonomers are vinyl substituted aromatic and aliphatic compounds, such as acrylonitrile, butene, styrene and the like.

The polyisocyanate for curing the prepolymer can be selected from those of the general formula $R(NCO)_m$ in which R is a di- or polyvalent organic radical containing from 2–30 carbon atoms and m is 2, 3 or 4. R can be alkylene, arylene, aralkylene or cyloalkylene. It is preferred that the organic radical be essentially hydrocarbon in character although the presence of unreactive groups containing elements other than carbon and hydrogen is permissible as is the presence of reactive groups which are not capable of reacting with functional groups capable of forming urea or carbamate linkages such as to interfere with the desired reaction.

Examples of suitable compounds of this type include benzene-1, 3-diisocyanate, hexane 1,6-diisocyanate, toluene 2,4-diisocyanate (TDI), toluene 2,3-diisocyanate, diphenylmethane 4,4'-diisocyanate, naphthalene 1,5-diisocyanate, diphenyl 3,3'-dimethyl 4,4'-diisocyanate, diphenyl 3,3'-dimethoxy 4,4'-diisocyanate diethyl ether, 3-(diethylamino)-pentane 1,5-diisocyanate, butane-1,4-diisocyanate, cyclohex-4ene-1,2-diisocyanate, benzene-1,3,4-triisocyanate, naphthalene-1,3,5,7-tetraisocyanate, naphthalene-1,3,7-triisocyanate, toluidine-diisocyanate, isocyanate terminated prepolymers polyaryl polyisocyanates, and the like.

Polyols are preferably, but not limited to, diols or triols and can be either saturated or unsaturated aliphatic, aromatic or certain polyester or polyether products. Exemplary compounds include glycerol, ethylene glycol, propylene glycol, neopentylglycol, pentaerythritol, trimethylolethane, glycerol triricinoleate, or alkylene oxide adducts of aniline such as Isonol which is N,N-bis-(2-hydroxypropyl) aniline and many other polyols well known in the art which can be incorporated into the liner composition to control the degree of crosslinking. The particular compound and amount utilized is dependent on the functionality and nature of the hydroxyl terminated prepolymer and polyisocyanate employed in the liner composition.

Since the functionality of Li-HTPB is generally slightly less than 2, the polyol is preferably a triol so as to provide upon reaction with the polyisocyanate crosslinking between polymeric chains. As exemplary polyols, mention may be made of glycerol triricinoleate (GTRO) and Isonol (a propylene oxide adduct of aniline), N,N-bis-(2-hydroxypropyl)-aniline. The polyisocyanate is present in an amount necessary to satisfy stoichiometry, that is, the functionality of the HTPB and any other polyol present in the composition. The polyisocyanate may be a di-, tri- or higher functional material and may be aliphatic in nature such as hexanediisocyanate but is preferably an aromatic polyisocyanate such as TDI. A catalytic cure promoting agent can be utilized. These agents may be metal salt such as metal acetylacetonates, preferably thorium acetylacetonate (ThAA) since iron acetylacetonate and other iron salts may act as an oxidation catalyst for the unsaturated linkages in the HTPB.

The stable, solid, isocyanate precursor additive is present in the liner composition in an amount in excess of the polyisocyanate necessary to satisfy stoichiometry. The precursor is preferably a material that is solid up to a temperature of at least about 150° F. Typically, the precursor is present in an amount of from 2–10% of the weight of the composition. The precursor may be the sole polyisocyanate present but preferably is utilized in the presence of a lower molecular weight liquid polyisocyanate as defined above. The polyisocyanate should provide substantially all the curing agent necessary for stoichiometric cure of the liner and the precursor would then be present in a controlled excess amount.

Exemplary additives are solid dimers or trimers of organic isocyanates selected from compounds of the formula:

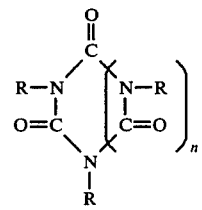

where R is the same or different aliphatic or aromatic group preferably containing at least one —NCO group, suitably lower alkyl or aryl, and n is an integer from 0 to 1.

Aromatic isocyanates may form dimers or trimers while the aliphatic isocyanates usually form trimers. The dimer ring (uretidine dione) is less stable and more reactive than the trimer ring (isocyanurate) and the dimer will more readily dissociate and at a faster rate to provide monomeric isocyanate. The NCO moieties contained within the dimer ring are also known to react directly with active hydrogen compounds. It is preferred that the dimer be synthesized from aromatic diisocyanates such as toluene diisocyanate, 4,4'-diphenylmethane diisocyanate and bis-phenyl diisocyanate to form dimers of the formula:

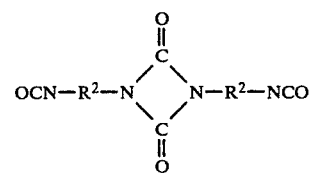

where $R^2$ is phenylene, alkyl phenylene or phenyl alkylene. Ortho-substitution should be avoided since it is found to greatly retard the rate of dimer formation.

Dimerization is catalyzed vigorously in the presence of trialkyl phosphines such as tributyl phosphine and more mildly by tertiary amines such as pyridine. The reaction is a reversible equilibrium reaction. The conversion to dimer at equilibrium increases with decreasing temperature and with removal of dimer from the reaction mixture. Conversely the dissociation of dimer can be favored by higher temperature and removal of monomeric isocyanate. A preferred dimer material is TDI dimer which is readily available or can be synthesized from a commercially available monomer. TDI dimer is a solid, crystalline material that can be isolated and added to the liner composition prior to applying the liner to the chamber.

Solid fillers can be selected from antimony oxide, carbon black, fibrous silica or the like. These provide both structural strength and heat insulation qualities to the product. Heat insulating binders generally include both $Sb_2O_3$ and silica fibers. Liners having lower heat insulation characteristics may include only carbon black filler. Stabilizers may be selected from aromatic amines such as di-$\beta$-naphthyl-p-phenylenediamine, thioesters such as ditridecylthiodiproprionate, sulfur and chromic chloride. A suitable rheological control additive is Thixcin E which is a thixotropic agent (Baker Castor Oil Co.).

General and Specific liner compositions are presented in the following Table:

TABLE I

| Component Type | Name | Wt % Range | Ex. 1 High-Heat Insulating Wt % | Ex. 2 Low-Heat Insulating Wt % |
|---|---|---|---|---|
| Antimony Oxide | $Sb_2O_3$ | 0–15 | 10 | 0 |
| Carbon Black | | 5–15 | 10 | 5 |
| Silica Fiber | | 0–10 | 6 | 0 |
| HTPB | | 30–50 | 48.22 | 42 |
| Cross-linking Agent | Glycerol Triricinoleate | 5–15 | 7.19 | 16 |
| TDI | | 0–30 | | 24 |
| Isonol | | 2–6 | 4.13 | 8 |
| Cure-Catalyst | ThAA | 0.1–0.3 | 0.20 | 0.20 |
| HTPB Stabilizers | Aromatic Amine Sulfur | 0.5–9.0 | 5.90 | 7.98 |
| Stabilizer | Thioether | | | |
| Thickener | Thixcin E | 0–2 | 0.98 | 0.98 |

The liner is prepared by forming a premix of all components except the isocyanate and the precursor. The premix may be heated if required to dissolve the components, typically to a temperature between 100° to 160° F. The isocyanate and precursor are then added and blended into the premix. The liner composition is then applied by spraying, brushing or casting onto the EPR rubber insulation layer and permitted to fully cure in place. Typical liner thicknesses range between 1/64 and ¼ inch in thickness.

During cure of the liner composition there are competing reactions between the isocyanate groups of the liquid polyisocyanate, solid dimer and the hydroxyl groups of the polybutadiene and triol. However, since the dimer is present in an excess amount over stoichiometry, even though some of the NCO groups thereon or dione rings may react with the hydroxyl groups, there is an excess available for reaction with the propellant. Furthermore, reaction with the liner contributes to localizing the dimer molecules from migration and serves to strengthen the interfacial bond with the propellant.

The propellant is cast onto the surface of the fully cured liner. The propellant formulation is typically prepared at a temperature of from 70° F. to 150° F. The propellant composition usually contains a high proportion of combustible solids typically in excess of 65% by weight, a small proportion of binder usually below 15% by weight and a small amount below about 3% by weight of burning rate accelerator. The combustible solids usually comprise an oxidizer such as ammonium perchlorate and a finely divided metal such as aluminum powder.

EXAMPLE 3

As the sole isocyanate curing agent, TDI dimer was mixed with the heat insulating premix as prepared in Example 1 in the proportions of 1.4 grams of dimer to 9.3 grams of premix. After approximately 1 hour at 135° F. the sample appeared to be almost cured.

EXAMPLE 4

TDI dimer in an amount less than stoichiometry was mixed with the heat insulating premix of Example 1 in the ratio 0.75 grams of dimer to 9.3 grams of premix. After 16 hours at 135° F., the sample of Example 3 was fairly hard and tough, while the sample of Example 4 was soft with poor strength.

EXAMPLE 5

A sample (A) was prepared containing 1.0 grams of dimer to 9.37 grams of the heat insulating premix of Example 1. Another sample (B) was prepared containing 0.34 grams of dimer and 0.75 grams of TDI to 9.37 grams of said premix. Both samples were put in a 135° F. oven for ten hours. Sample 5A was a fairly tough material but cracks when bent at a 90° angle. The shiny surface became dull after standing at room temperature at approximately 30% Relative Humidity (R.H.). Sample 5B was a tough material that does not crack on bending. The shiny surface became dull and standing at room temperature on 30% R.H. for approximately 30 minutes.

EXAMPLE 6

A. A liner composition was prepared containing 4.36 grams of dimer (150% Eq as TDI) and 37.5 grams of the premix of Example 1.

B. A liner composition was prepared containing 1.36 grams of dimer (47% Eq.), 3.0 grams of TDI (103% Eq.) and 37.5 grams of said premix.

C. A liner composition was prepared containing 3.64 grams of TDI (125% Eq.) and 37.5 grams of said premix.

The compositions were cured at 135° F. for ten hours.

The formulation of Example 6A was grainy indicating that the dimer was not soluble and was not sufficiently dispersed by hand mixing. A repeat of Example 6A using more finely divided dimer resulted in a useable liner composition. The Example 6B formulation was prepared by first dispersing the dimer in TDI with stirring to form a paste. The paste and premix can then be readily combined. Example 6C was prepared by mixing TDI with the premix. The results of testing the liner formulations of Examples 6A, 6B and 6C are set forth in Table II.

EXAMPLE 7

A Li-HTPB based propellant was prepared containing 88% solids by mixing together in parts by weights 73 parts of ammonium perchlorate, 15 parts of aluminum powder, 1 part of burning rate accelerator and 11 parts of a Li-HTPB binder system including a stoichiometric amount of TDI.

EXAMPLE 8

A FR-HTPB propellant was prepared containing 86% solids by mixing together in parts by weight, 70 parts of ammonium perchlorate, 16 parts of aluminum powder, 1¼ parts of burning rate accelerator and 12 parts of the FR-HTPB including a stoichiometric amount of TDI.

The adhesion of the various liners to these propellants was tested by casting the propellant onto the precured liners and conducting an initial bond strength test and an aged bond strength test after exposing the assembly to a temperature of 160° F. for seven weeks at 30% R.H. The data is presented below.

TABLE II

| Liner | Propellant | Initial Bond Tensile Strength | | | Aged Bond Tensile Strength | | |
|---|---|---|---|---|---|---|---|
| | | psi | Break | Surface | psi | Break | Surface |
| Ex. 6A | Ex. 8 | 17 | CPI | sticky | No improvement of Bond | | |
| Ex. 6B | Ex. 7 | 139 | CPI[2] | dry | 111 | CPI | dry |
| Ex. 6B | Ex. 8 | 128 | CP[1] | dry | 145 | CP | |
| Ex. 6C | Ex. 7 | 54 | CPI | sticky | 37 | CPI | sticky |
| Ex. 6C | Ex. 8 | 83 | ALM[3] | soft and sticky | 69 | ALM | sticky |

[1]CP - Cohesive in propellant
[2]CPI - Cohesive in propellant at the interface
[3]ALM - Adhesion of the liner-chamber failed.

Bond tensile strengths above 90-95 psi are considered very good. The data demonstrates that the use of excess TDI (Ex. 6C) does not provide a satisfactory product and that the use of TDI dimer in combination with TDI monomer (Ex. 6B) provides a far superior increase in both strength as compared to the use of TDI dimer alone (Ex. 6A). When a mixture of monomer and dimer TDI is used, the dimer is present in excess of the liner cure requirement. Similar comparable results would be obtained by the use of other dimers or trimers in place of TDI dimer.

The adhesion of the liner of Example 6B was compared to that of prior art liner compositions which do not contain dimer. The data provided in Table III are all directly comparable because all of the bond specimens were prepared from the same batch of propellant of each type.

TABLE III

| LINER | PROPELLANT | BOND STRENGTH, psi | |
|---|---|---|---|
| | | Initial | Aged |
| Ex. 6B | Ex. 7 | 142 | 141 |
| Ex. 6B | Ex. 8 | 165 | 163 |
| AAE-WC[1] | Ex. 7 | 124 | 119 |
| AAE-WC[1] | Ex. 8 | 134 | 128 |
| AAE | Ex. 7 | 103 | 101 |
| AAE | Ex. 8 | 127 | 116 |

[1]A fully cured HTPB liner washcoated with TDI dissolved in chlorothene.

While all the above-described provide satisfactory bond strength, the most desirable bonds are obtained with liner formulations according to this invention.

When a TDI-chlorothene washcoat is utilized, the bonding life, i.e. the time interval between application of the washcoat and casting of the propellant, is only a few hours regardless of the humidity to which the liner is exposed. The non-criticality of the time of casting the propellant onto the liners of this invention is illustrated by the following tests. The liner of Example 6B was tested for extended bonding life as shown in the following tables.

TABLE IV

| PROPELLANT | % R.H. | DAYS AT R.H. | BOND STRENGTH | |
|---|---|---|---|---|
| | | | psi | BREAK |
| Ex. 7 | 0 | 10 | 139 | CPI |
| " | 0 | 6 | 148 | CPI |
| " | 0 | 3 | 140 | CPI/CP |
| " | 20 | 10 | 144 | CP |
| " | 20 | 6 | 140 | CPI |
| " | 20 | 3 | 139 | CPI |
| " | 30 | 10 | 150 | CP |
| " | 30 | 6 | 137 | CPI |
| " | 30 | 3 | 137 | CPI |
| " | 50 | 10 | 141 | CP |
| " | 50 | 6 | 136 | CP |
| " | 50 | 3 | 141 | CPI/CP |

TABLE V

| PROPELLANT | % R.H. | DAYS AT R.H. | BOND STRENGTH | |
|---|---|---|---|---|
| | | | psi | BREAK |
| Ex. 8 | 0 | 6 | 153 | CP |
| " | 0 | 3 | 155 | CP |
| " | 20 | 6 | 151 | CP |
| " | 20 | 3 | 148 | CP |
| " | 30 | 6 | 142 | CP |
| " | 30 | 3 | 145 | CP |
| " | 50 | 6 | 140 | CP |
| " | 50 | 3 | 141 | CP |

For the two propellants (Ex. 8-Table V and Ex. 7-Table IV) the bonding life (the time the cured liner can stand before propellant is cast) is at least 10 days at humidities as high as 50% R.H.

The extended bonding life is of significant advantage in the production of rocket motors since the liner schedule need not be related to the propellant schedule but may be stored for substantial periods before the propellant is cast.

It is to be realized that only preferred embodiments of the invention have been described and that numerous substitutions, alterations and modifications are all permissible without departing from the spirit and scope of the invention as defined in the following claims.

I claim:

1. A method of improving the adherence of a layer of a first composition containing organic active hydrogen compounds to a surface comprising the steps of:
    applying to said surface a film of a composition comprising polyurethane forming components having dispersed therein a stable, solid polyisocyanate precursor additive in an amount in excess of the amount necessary to form the polyurethane and which is reactive after cure of the composition with said compounds;

curing said composition to form a polyurethane film containing excess stable, solid polyisocyanate precursor additive;
applying said layer to said film; and
curing said layer and reacting said active hydrogen compounds with said excess additive to form bonds binding said film to said layer.

2. A method according to claim 1 in which the additive is a solid up to a temperature of 150° F.

3. A method according to claim 1 in which the additive is present in an amount from 2-10% of the composition.

4. A method according to claim 1 in which the additive is selected from compounds of the formula:

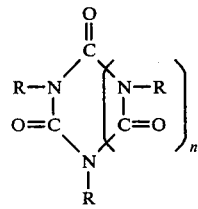

where R is an aliphatic or aromatic group and n is an integer from 0 to 1.

5. A method according to claim 4 in which R is lower alkyl or aryl and contains at least one -NCO group.

6. A method according to claim 5 in which the additive is a dimer selected from those of the formula:

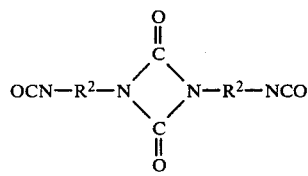

where $R^2$ is arylene, alkyl arylene or aryl alkylene.

7. A method according to claim 6 in which the additive is a dimer of members selected from the group consisting of toluene diisocyanate, 4,4'-diphenylmethane diisocyanate and bis-phenyl diisocyanate.

8. A method according to claim 7 in which the additive is a dimer of toluene diisocyanate.

9. A method according to claim 1 in which the composition includes at least one polyol and an amount of polyisocyanate sufficient to react with said polyol, and said additive is present in an amount over the stoichiometric amount for cure.

10. A method according to claim 9 in which the polyisocyanate is toluene diisocyanate.

11. A method according to claim 9 in which the polyol is present in an amount of 20-65 parts by weight of the composition and comprises a liquid hydroxyl containing prepolymer.

12. A method according to claim 11 in which the prepolymer is a conjugated diene polymer having an equivalent weight from 1000-5000 and a functionality from about 1.7 to 3.0.

13. A method of improving the adherence of a solid rocket propellant to a rocket motor casing containing the propellant which comprises:
applying to said casing a layer of a composition comprising polyurethane forming components having dispersed therein a stable, solid polyisocyanate precursor additive in an amount in excess of the amount necessary to form the polyurethane, which excess is reactive, after cure of the composition, with organic active hydrogen compounds;
curing said composition to form a polyurethane liner containing excess additive;
applying to said polyurethane liner a layer of a curable propellant composition containing organic active hydrogen compounds; and
curing said propellant composition and reacting said active hydrogen compounds with said excess additive to form a solid rocket propellant having bonds binding said propellant to said liner.

14. An assembly having improved bonding between layers comprising in combination:
a first layer comprising polyurethane formed by cure of a first composition comprising polyurethane forming components in which is dispersed a stable, solid polyisocyanate precursor additive in excess of the amount necessary to form said polyurethane and which excess additive is reactive after cure of the composition with organic active hydrogen compounds; and
a second layer adhered to said first layer, said second layer being formed by applying a second composition containing organic active hydrogen compounds to said first layer and curing said second composition, said active hydrogen compounds being reacted with said excess additive to form interfacial bonds between said layers.

15. An assembly according to claim 14 in which the additive is a solid up to a temperature of about 150° F.

16. An assembly according to claim 14 in which the additive is present in an amount from 2-10% of the composition.

17. An additive according to claim 14 in which the additive is selected from compounds of the formula:

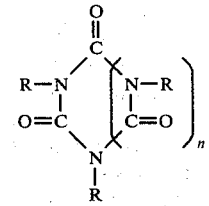

where R is an aliphatic or aromatic group and N is an integer from 0 to 1.

18. An assembly according to claim 17 in which R is lower alkyl or aryl and contains at least one —NCO group.

19. An assembly according to claim 18 in which the additive is a dimer selected from those of the formula:

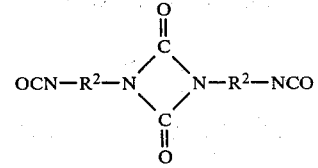

where $R^2$ is arylene, alkyl arylene or aryl alkylene.

20. An assembly according to claim 19 in which the additive is a dimer of members selected from the group consisting of toluene diisocyanate, 4,4'-diphenylmethane diisocyanate and bis-phenyl diisocyanate.

21. An assembly according to claim 20 in which the additive is a dimer of toluene diisocyanate.

22. An assembly according to claim 14 in which the composition includes at least one polyol and an amount of polyisocyanate sufficient to react with said polyol, and said additive is present in an amount over the stoichiometric amount for cure.

23. An assembly according to claim 22 in which the polyisocyanate is toluene diisocyanate.

24. An assembly according to claim 22 in which the polyol is present in an amount of 20-65 parts by weight of the composition and comprises a liquid hydroxyl containing polymer.

25. An assembly according to claim 24 in which the prepolymer is a conjugated diene polymer having an equivalent weight from 1000-5000 and a functionality from about 1.7 to 3.0.

26. A solid propellant rocket motor comprising:

a casing;

a cured polyurethane liner within said casing formed by cure of a liner composition comprising polyurethane forming components in which is dispersed a stable, solid polyisocyanate precursor additive in excess of the amount necessary to form said polyurethane and which is reactive, after cure of the composition, with organic active hydrogen compounds; and propellant adhered to said liner formed by applying to said liner a propellant composition containing organic active hydrogen compounds and curing said propellant composition and reacting said active hydrogen compounds with said excess additive to form interfacial bonds between said liner and said propellant.

* * * * *